No. 862,088. PATENTED JULY 30, 1907.
H. J. S. MARTIN.
METALLIC COUPLING FOR THE CONVEYANCE OF FLUIDS BETWEEN VEHICLES.
APPLICATION FILED JUNE 29, 1906.

Witnesses.
Lloyd Blackmore
D. W. Colton

Inventor.
H. J. S. Martin
by E. J. Fetherstonhaugh

UNITED STATES PATENT OFFICE.

HENRY JAMES STUART MARTIN, OF MONTREAL, QUEBEC, CANADA, ASSIGNOR OF ONE-THIRD TO FREDERICK THOMAS ENRIGHT AND ONE-THIRD TO WILLIAM JAMES HENDERSON, BOTH OF MONTREAL, CANADA.

METALLIC COUPLING FOR THE CONVEYANCE OF FLUIDS BETWEEN VEHICLES.

No. 862,088. Specification of Letters Patent. Patented July 30, 1907.

Application filed June 29, 1906. Serial No. 324,029.

*To all whom it may concern:*

Be it known that I, HENRY JAMES STUART MARTIN, a subject of the King of Great Britain, residing at 271 Delormier avenue, in the city of Montreal, in the District of Montreal, in the Province of Quebec, in the Dominion of Canada, have invented certain new and useful Improvements in Metallic Couplings for the Conveyance of Fluids Between Vehicles, of which the following is a specification.

This invention relates to improvements in metallic couplings for the conveyance of fluids between vehicles.

The invention consists essentially of a plurality of ring and socket joints interposed in a universal arrangement of pipes between two vehicles.

The objects of the invention are to devise a coupling in which the maintenance charges will be reduced to the minimum and to provide flexibility without endangering the fluid tight connections.

Figure 1:
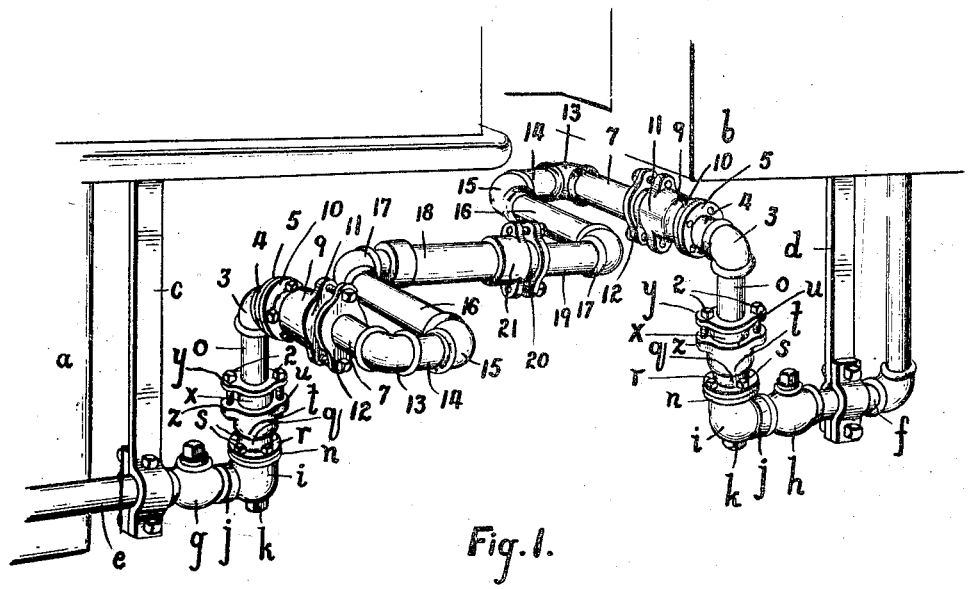
Figure 2:
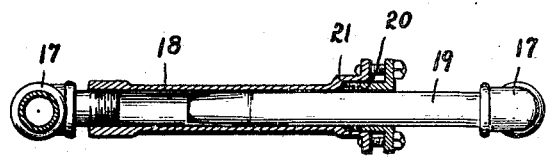
Figure 3:
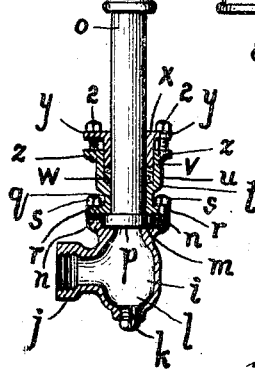
Figure 4:
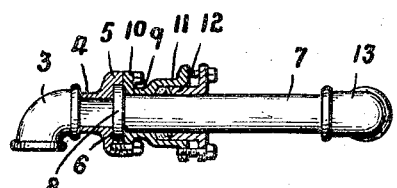

In the drawings, Figure 1 is a perspective view of the coupling showing the connections to the vehicles. Fig. 2 is a longitudinal sectional view of the middle and telescopically arranged pipes. Fig. 3 is a vertical sectional view of the joint at the point of connection with the pipe attached to the vehicles. Fig. 4 is a longitudinal section of an intermediate joint.

Like letters of reference indicate corresponding parts in each figure.

Referring to the drawings, $a$ is the locomotive and $b$ the tender and $c$ and $d$ brackets depending from said locomotive, and said tender respectively and supporting the pipes $e$ and $f$, the pipe $e$ leads to the injector of the locomotive and the pipe $f$ leads from the water supply in the tender.

$g$ and $h$ are lazy-cocks at the ends of the pipes $e$ and $f$. $i$ are joint members having extending from one side thereof the sleeve portions $j$ internally threaded and screwing on to the correspondingly threaded ends of the pipes $e$ and $f$. $k$ are screw plugs closing orifices correspondingly threaded at the bottom of the basin portion $l$ of the chambers contained within the joint members $i$.

$m$ are annular recesses encircled by the flanges $n$ at the top and open end of the joint members $i$.

$o$ are pipes or tubes having at their inner ends the rings $p$ preferably brazed thereon and fitting snugly into the annular recesses $m$ and forming journal bearings on which said flanges $n$ turn.

$q$ are sleeves encircling the pipes $o$ and having at their lower ends the lateral flanges $r$ and bolt holes through said lateral flanges $r$ registering with corresponding bolt holes through the annular flanges $n$ and firmly secured to said flanges $n$ by the bolts $s$ thus inclosing the rings $p$ securely in their journals. The sleeves $q$ flaring outwardly at $t$ have the upwardly extending enlarged portions $u$ encircling the pipes $o$ and forming between said pipes and said upward extensions the annular gland boxes $v$.

$w$ are packing rings of any suitable material and encircling the pipes $o$ at the lower end of the said gland boxes $v$.

$x$ are gland members encircling the pipes $o$ and extending downwardly into the gland boxes $v$ abutting said packing ring and completing the gland and having the lateral flanges $y$ and suitable bolt holes through said flanges $y$ registering with bolt holes through the lateral flanges $z$ at the top of the upward extensions $u$ and secured to said flanges $z$ by the bolts 2 extending through the aforesaid bolt holes. It will be thus seen that the joints formed with the pipes $e$ and $f$ and the pipes $o$ are complete. One member of said joints, viz:—the rings $p$ being on the end of the said pipes, the other members $i$ being firmly secured to the said pipes $e$ and $f$, and as all movements will be confined to the vehicles caused by their varying positions in relation one to the other and the vibratory motions thereof, the joint members $i$ will in their recessed portions form the journal bearing on the rings $p$. The glands in the sleeves $q$ will effectually prevent any leakage through the ring and socket portion.

The pipes $o$ at the upper ends thereof have the elbows 3 secured thereto and secured to the outer end of the elbows 3 are the pipes 4 arranged at right angles to the pipes $o$. The pipes 4 have the lateral flanges 5 and annular recesses 6 in said flanges corresponding to the recesses $m$ aforesaid.

7 are pipes having the rings 8 brazed thereon at the end thereof and fitting snugly into the recesses 6 and turning therein.

9 are sleeves having the flanges 10 secured to the flanges 5 and the enlarged extensions 11 forming the glands 12 of precisely similar formation to the aforesaid glands in the sleeves $q$.

The pipes 7 extend along to the elbows 13, which have the pipes 14 extending therefrom to the elbows 15, which in turn have the pipes 16 extending therealong parallel to the pipes 7, to the elbows 17 and from the elbows 17 extend the telescopic pipes 18 and 19 having the gland 20 formed at the enlarged end 21 of the pipe 18. In this arrangement of pipes and joints a universal coupling for the passage of water or other fluids is effected, as no matter what position the tender may assume in relation to the locomotive, the combination of the turning of the joint members $i$ on the rings $p$ and the rings 8 in the recesses 6 and the drawing inwardly and outwardly of the pipes 18 and 19 will accommodate any such position.

The difficulty in metallic couplings in the past has been chiefly in the arrangements of joints, that is to obtain some form of flexible connection whereby the jolting and jarring of the vehicles will not cause a leak in that connection and besides will not be a constant trouble and expense as regards maintenance. In the present invention these troubles are all obviated, as the simplicity of the flexible connection, and the arrangement of the pipes provide a permanent coupling, which will not shake to pieces or become disarranged sufficiently to allow a leak in the connection.

The invention as described is more particularly applicable for conveying the water from the tank in the tender to the injector of the locomotive, as a device for this purpose has been more in demand than for the simple conveying of steam or compressed air between vehicles, but it must be understood that the arrangement of coupling, as described, or any modification thereof containing the essential features of the invention could be equally as well applied for the conveyance of compressed air or steam or other fluid between vehicles, and without departing from the spirit of my invention the arrangement of the pipes or the placing of the joints may be materially altered.

Another advantage may be mentioned in connection with this invention, and that is in the event of the parting of the tender from the locomotive through accident, for in case of such an event, all that happens to the coupling is that the pipe 19 draws out from the pipe 18, and through the intermediate joints, the ends drop to an angle of about forty-five degrees, thus eliminating any chance of breakage to the coupling on the sudden bringing together again of the locomotive and tender.

What I claim as my invention is:

1. In a device of the class described, in combination, a fluid pipe supported by a vehicle, a fluid pipe supported by a vehicle following the aforesaid vehicle, a pair of joint members secured to the open ends of each of the aforesaid pipes respectively, a pair of pipes having joint members inserted in the aforesaid joint members respectively and suitably secured therein, said pipes extending from the vehicle pipes and at right angles thereto and extending in a further length at right angles to the length directly connected to the vehicle pipes and forming U-shaped bends and terminating in pipes telescopically arranged, and at right angles to said U-shaped bend, and a pair of joints interposed in each of the second lengths of pipe, said joints having a rotary motion, as and for the purpose specified.

2. In a device of the class described, in combination, pipes supported by adjoining vehicles, a pair of joint members secured to the ends of said pipes and containing a chamber having a drain opening at the bottom thereof, a pair of screw plugs closing said drain openings, a pair of pipes and a ring secured on the ends respectively coacting with the aforesaid joint member, pipes extending in bends from the said pipes having the rings thereon and telescopically meeting and ring and socket joints interposed intermediately in the latter pipes, as and for the purpose specified.

3. In a device of the class described, in combination, pipes supported by adjoining vehicles, a pair of joint members having lateral extending sleeves forming the entrance to the chamber contained within each of said members and secured to the ends of the aforesaid pipes and flanged upper open ends forming annular recesses, a pair of pipes and a ring secured on each of their inner ends, said rings being inserted in said annular recesses and forming bearings on which said joint members are journaled, a sleeve encircling said ringed pipes and having lateral flanges secured to the aforesaid flanges and an enlarged outer end surrounding said pipe and forming a gland box, a packing ring in said gland box, a gland member encircling each of said pipes and extending into said gland box and secured to said sleeve, pipes extending from said ringed pipes in suitable bends and meeting telescopically and a ring and socket joints interposed intermediately in the latter pipes, as and for the purpose specified.

4. In a device of the class described, pipes supported by adjoining vehicles, a pair of joint members having lateral sleeves extending therefrom and forming the opening thereto and secured to the ends of said pipes, flanges at the top and open end thereof forming annular recesses and a drain opening at the bottom thereof suitably plugged, a pipe and a ring at the inner end thereof inserted in each of said annular recesses, a pair of sleeves having lateral flanges at each end thereof and secured to the aforesaid flanges of the joint members and encircling each of said ringed pipes respectively and having an enlarged outer portion surrounding said pipes forming a gland box, a pair of gland members encircling said pipes and having lateral flanges and secured to the outer flanges of said sleeves, a packing ring in each of said gland boxes, pipes extending from said ringed pipes in suitable bends and meeting telescopically, a pair of ring and socket joints of similar formation to the aforesaid joint and interposed in each of the first lengths of pipe extending from the aforesaid ringed pipes and a suitable gland in said telescopic joint, as and for the purpose specified.
5. In a device of the class described, in combination, a plurality of ring and socket joints having the ring portion thereof secured on the end of a pipe and the socket portion thereof formed as an annular recess in a lateral extending flange from the joint member and a sleeve encircling said ringed pipe having lateral extending flanges at each end thereof, the inner flange thereof being secured to the aforesaid flange on the joint member and inclosing said ring, said sleeve having an enlarged outer portion surrounding the ringed pipe forming a gland box, a packing ring in said gland box and a gland member extending into the top of said gland boxes and securing said packing ring and having lateral extending flanges secured to the outer flanges of the sleeve, pipes secured to pipes on the vehicles and arranged in right angular bends and meeting in the center telescopically and a gland formed in said telescopic arrangement, as and for the purpose specified.

Signed at the city of Montreal, in the district of Montreal, in the Province of Quebec, in the Dominion of Canada, this 27th. day of June, 1906.

HENRY JAMES STUART MARTIN.

Witnesses:
LLOYD BLACKMORE,
B. CHARLEBOIS.